(12) United States Patent
Zwilling et al.

(10) Patent No.: US 8,326,872 B2
(45) Date of Patent: Dec. 4, 2012

(54) DATABASE SANDBOX

(75) Inventors: Michael J. Zwilling, Redmond, WA (US); Raul Garcia, Kirkland, WA (US); Ruslan Pavlovich Ovechkin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 12/035,548

(22) Filed: Feb. 22, 2008

(65) Prior Publication Data

US 2009/0216768 A1 Aug. 27, 2009

(51) Int. Cl.
*G06F 17/30* (2006.01)
(52) U.S. Cl. ........................................... 707/783
(58) Field of Classification Search ........... 707/999.009, 707/781–787, 789, 694, 702, 687
See application file for complete search history.

(56) References Cited

U.S. PATENT DOCUMENTS

| | | | |
|---|---|---|---|
| 5,895,467 A | 4/1999 | Ubell et al. | |
| 6,775,668 B1 * | 8/2004 | Goel | 1/1 |
| 7,047,234 B2 | 5/2006 | French et al. | |
| 2003/0033536 A1 * | 2/2003 | Pak et al. | 713/188 |
| 2005/0262108 A1 * | 11/2005 | Gupta | 707/100 |
| 2006/0173810 A1 | 8/2006 | Hom et al. | |
| 2006/0248083 A1 | 11/2006 | Sack et al. | |
| 2006/0282433 A1 | 12/2006 | Dutta et al. | |
| 2006/0288214 A1 | 12/2006 | Dutta et al. | |
| 2007/0055667 A1 * | 3/2007 | Wong | 707/9 |
| 2007/0192623 A1 | 8/2007 | Chandrasekaran | |

OTHER PUBLICATIONS

Rosenblum, Michael, et al., "Oracle PL/SQL for Dummies" Jun. 13, 2006, John Wiley & Sons, 4 pages total.*
Carter, Robert G., "Authentication vs. Authorization" May 19, 2007, Archive.org <http://web.archive.org/web/20070519041827/http://www.duke.edu/~rob/kerberos/authvauth.html> p. 1-2.*
Gennick, Johnathan, "Sams Teach Yourself PL/SQL in 21 Days" Jan. 1, 2000, Sams <http://www.developer.com/article.phpr/777761/Day-1-Learning-the-Basics-of-PLSQL.htm>, p. 1-20.*
Wikipedia, "PL/SQL" Feb. 21, 2007, Wikipedia.org <http://en.wikipedia.org/w/index.php?title=PL/SQL&oldid=109864925>, p. 1-8.*

(Continued)

*Primary Examiner* — James Trujillo
*Assistant Examiner* — Jorge A Casanova
(74) *Attorney, Agent, or Firm* — Workman Nydegger

(57) ABSTRACT

Systems and methods that qualify and/or restrict access of codes associated with a database to objects located outside thereof and in other databases—even though a person executing such code does in fact have permission to interact with the object that the code is attempting to access. A sandbox component can regulate access from one database to another database, by managing authenticator permission and/or trust permission levels. Hence, the set of privileges assigned to security execution context of an executable module (procedure, trigger, computed column) in an un-trusted database is restricted not to exceed a privilege set assigned to database owner.

19 Claims, 10 Drawing Sheets

OTHER PUBLICATIONS

Page, Robyn "SQL Server Security—The Crib Sheet" Feb. 20, 2007, Simpletalk.com <http://www.simple-talk.com/sql/database-administration/sql-server-security-cribsheet/>, p. 1-7.*

Shaya Potter. Secure Isolation and Migration of Untrusted Legacy Applications. http://www.ncl.cs.columbia.edu/publications/cucs-005-04.pdf. Last accessed Nov. 8, 2007, pp. 16.

Database Sandbox http://xunitpatterns.com/Database%20Sandbox.html. Last accessed Nov. 8, 2007, pp. 3.

B. Hashii, et al. Supporting Reconfigurable Security Policies for Mobile Programs. © PII: S1389-1 2 8 6 ( 0 0 ) 0 0 0 7 5-X. http://www.mirrorservice.org/sites/ftp.wiretapped.net/pub/security/development/secure-programming/hashii-et-al-2000-supporting-reconfigurable-security-policies-for-mobile-programs.pdf. Last accessed Nov. 8, 2007, pp. 17.

* cited by examiner

DATABASE SANDBOX

BACKGROUND

Computer systems provide a centralized source of valuable information that is often subject to attack. Systems are attacked by different people with disparate motives in a myriad of ways. Malicious hackers such as terrorists and hobby hackers are one category of people that attack computer systems. Terrorists or terror organizations can seek to steal information, damage or shut down systems to further their political and/or economic agendas. Hobbyists attempt to penetrate systems and cause damage for sport, to demonstrate their technological prowess and/or to expose vulnerabilities. Tools of malicious hackers can include viruses, worms, Trojan horses and other types of malware. Another category of people that attack systems is insiders. These people are often disgruntled employees who seek to utilize their authorization and knowledge of a system to appropriate or destroy information and/or shut the system down. While harm caused by attacks can vary, as a whole the cost in terms of time, money and privacy can be astronomical.

Various security software and/or packages are conventionally employed to combat hostilities with respect to computer systems. Such security software is device centric. In practice, a device is initially scrutinized by security software to locate and remove malicious or suspicious software (e.g., viruses, worms, spy ware . . . ). Furthermore, security settings or preferences can be set in an attempt to balance usability with protection. Thereafter, it is assumed that a device is safe or trusted and attempts are made to thwart outside malicious activity from affecting the device, such as by monitoring incoming data, ports, and device executable software for suspicious activity. A user or administrator can be notified upon detection of suspicious activity and to provide guidance with respect to any action to be taken. For example, a user can choose to allow a particular program to execute or block access to a process attempting to access a machine. In essence, the described security software attempts to prevent unauthorized device access. Other security mechanisms can be utilized to protect information should the prevention fail.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Such database systems can become complex to manage, wherein substantial investment of time of a skilled administrator is typically required. For example, adjusting required hardware and software configuration in order to keep pace with changing workloads, user requirements, and hardware device failures becomes a challenging task. The administrator's job includes initial database configuration, continuous monitoring of the database's performance and knob tuning, as well as continuous reconfiguration, either to update the database resources or re-organize them in a different way.

In addition, modern database systems provide a separation of duties between a database administrator (db_admin) and a database owner (dbo). In general, db_admin is allowed to perform any actions in a database system, while a database owner (dbo) has full control only within the boundaries of his database and becomes an ordinary user outside his database domain. process attempting to access a machine. In essence, the described security software attempts to prevent unauthorized device access. Other security mechanisms can be utilized to protect information should the prevention fail.

Such can further expose the database administrators to risks such as a class of attack, which allows the possibility of a malicious dbo executing arbitrary code under context of db-admin, via luring mechanisms. For example db_admin can perform such harmless action as shrinking database files and inadvertently be lured into executing malicious procedures. Likewise, db_admin requires protection against malicious code planted inside attached database or a database backup file. The code in such database can be executed using both triggers or by tampering with known stored procedures to inject malicious payload. For example, such techniques enable an attacker to obtain full control of a database server, gain access to sensitive data, plant a worm or rootkit into a database server or employ a database server as a vehicle to hide and spread OS worms or rootkits.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation qualifies and restricts access of executable modules such as codes (e.g., stored procedures) in a database to access objects outside the database and located in other databases, via introducing a sandbox component. Such sandbox component can include attributes that can be set by a server administrator to regulate access from one database owner to another database owner, wherein authenticator permission and/or trust permission levels are managed. Accordingly, a code or piece of code originating from such database cannot leave the database and be directed to other databases. Moreover, execution of malicious codes by system administrators (e.g., inadvertently or where system administrators are lured into such execution) is mitigated. The sandbox component confines a code such that an attempt of a stored procedure in a database to access a table in another database fails. Moreover, sandboxing attributes can be modified by server administrator and not the database owner. Hence, set of privileges assigned to security execution context of an executable module (procedure, trigger, computed column) in an un-trusted database is restricted not to exceed a privilege set assigned to database owner, and resulting privilege set assigned to module execution context can be the most restrictive set between the module caller and the database owner. Accordingly, by marking module, security execution context can be authenticated or vouched by database owner in a sandbox database.

When a code in the database attempts to perform an operation on an object outside the database, a check or determination (e.g., automatic check) can be performed to restrict whether a code in the database can access any object outside the database—despite the fact that a person executing such code does in fact have permission to interact with the object that the code is attempting to access.

If such check or determination succeeds, the code signifies that it has suitable privileges to operate on the respective object outside the sandboxed area or the database. As explained earlier, if the code does not have suitable privileges, the code can be denied access to the object outside the database.

In a related aspect, a default database authenticator is introduced (e.g., as an additional attribute), which grants permission levels to the extent such permission levels are granted to owners and/or administrators (e.g., non-hosting scenario). An authorization trust link can be established for access to tables of other databases, from a stored procedure in a database, and the default authenticator established (e.g., trust link is broken if default authenticator is different between two databases.)

According to a methodology of the subject innovation, initially an attach operation is performed to attach database for introducing to the database server (e.g., Structured Query Language—SQL server). As such, the owner of the database has full control over the database. For example, if Alice as the owner and administrator of the database executes a code generated by someone else, the default authenticator can designate that such database is an added database with existing stored procedures that are not created by Alice.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
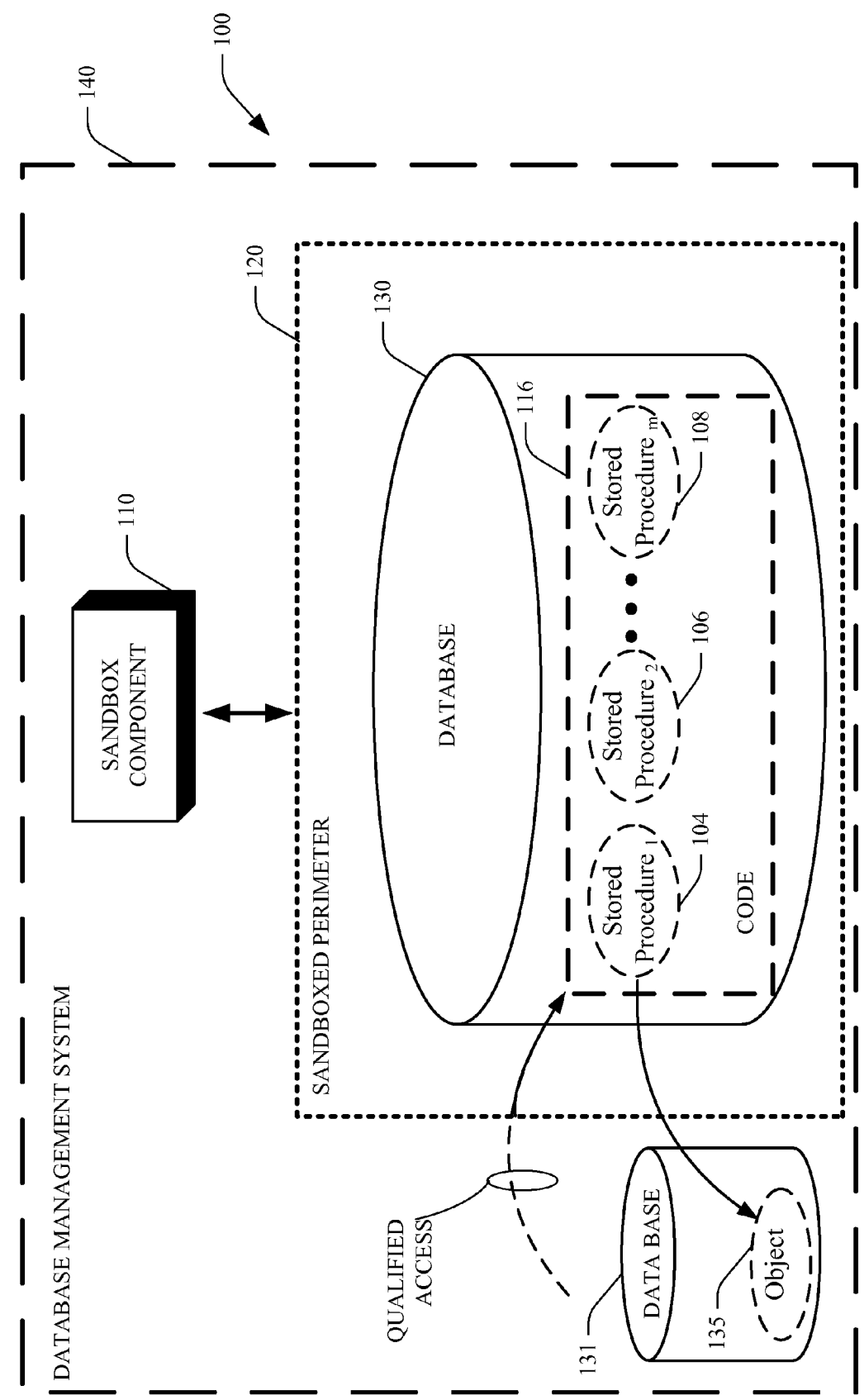
FIG. 1 illustrates a block diagram of a sandbox component that interacts with a database to qualify access to the objects outside the sandboxed area.

FIG. 1 illustrates a block diagram of a system 100 that provides for a sandbox component 110 in a database environment in accordance with an aspect of the subject innovation. The sandbox component 110 restricts access of codes 116 associated with the database management system 140 to objects outside the sandboxed area (e.g., the database 130). Such codes 116 can further include a plurality of stored procedures, wherein such stored procedures 104, 106, 108 (1 thru m, where m is an integer) are programs (or procedures) that are physically stored within the database 130 associated with the database management system 140. Such programs are usually written in a proprietary database language and in response to a user request, run directly by an engine of the database management system 140. It is to be appreciated that the subject innovation is not limited to stored procedures and other type of executable modules (e.g., User Defined Functions, triggers, and the like) are well within the realm of the subject innovation.

The stored procedures 104, 106, 108 can have direct access to the data that requires manipulation, and typically need only send results back to the user, thus mitigating the overhead of communicating large amounts of data back and forth. For example, typical uses for stored procedures 104, 106, 108 can include data validation, which is integrated into the database structure (stored procedures used for this purpose are often called triggers), or encapsulating some large or complex processing (such as manipulating a large dataset to produce a summarized result). Stored procedures 104, 106, 108 can also be employed when the database 130 associated with the database management system 140 is manipulated from many external programs, subject to the qualified access. The sandbox component 110 prevents the code 116 or a piece thereof, which is associated with the database 130 to access an object 135 in a database 131 external to the database 130 that the code resides therein. Moreover, execution of malicious codes by system administrators (e.g., inadvertently or where system administrators are lured into such execution) is mitigated.

Furthermore, the database 130 can be a complex model based database structure, wherein an item, a sub-item, a property, and a relationship are defined to allow representation of information within a data storage system as instances of complex types. For example, the database 130 can employ a set of basic building blocks for creating and managing rich, persisted objects and links between objects. An item can be defined as the smallest unit of consistency within the database 130, which can be independently secured, serialized, synchronized, copied, backup/restored, and the like. Such item can include an instance of a type, wherein all items in the database management system 140 can be stored in a single global extent of items. Furthermore, the database management system 140 can be based upon at least one item and/or a container structure, and can act as a storage platform exposing rich metadata that is buried in files as items. As explained earlier, the database management system 140 can include an associated database 130, to support the above discussed functionality, wherein any suitable characteristics and/or attributes can be implemented. Furthermore, the database management system 140 can employ a container hierarchical structure, wherein a container is an item that can contain at least one other item. Such containment concept can be implemented via a container ID property inside the associated class, wherein the store can also be a container in form of a physical organizational and manageability unit. In addition, the store represents a root container for a tree of containers within the hierarchical structure. As such, the sandbox component 110 can confine a code, such that an attempt of a stored procedure in a database of the database management system 140 to access a table in another database fails.

Moreover, sandboxing attributes can be modified by server administrator and not the database owner. Hence, set of privileges assigned to security execution context of an executable module (procedure, trigger, computed column) in an un-trusted database is restricted not to exceed a privilege set assigned to database owner, and resulting privilege set assigned to module execution context can be the most restrictive set between the module caller and the database owner. Accordingly, by marking module and/or the database, security execution context can be authenticated or vouched by database owner in a sandbox database.

Figure 2:
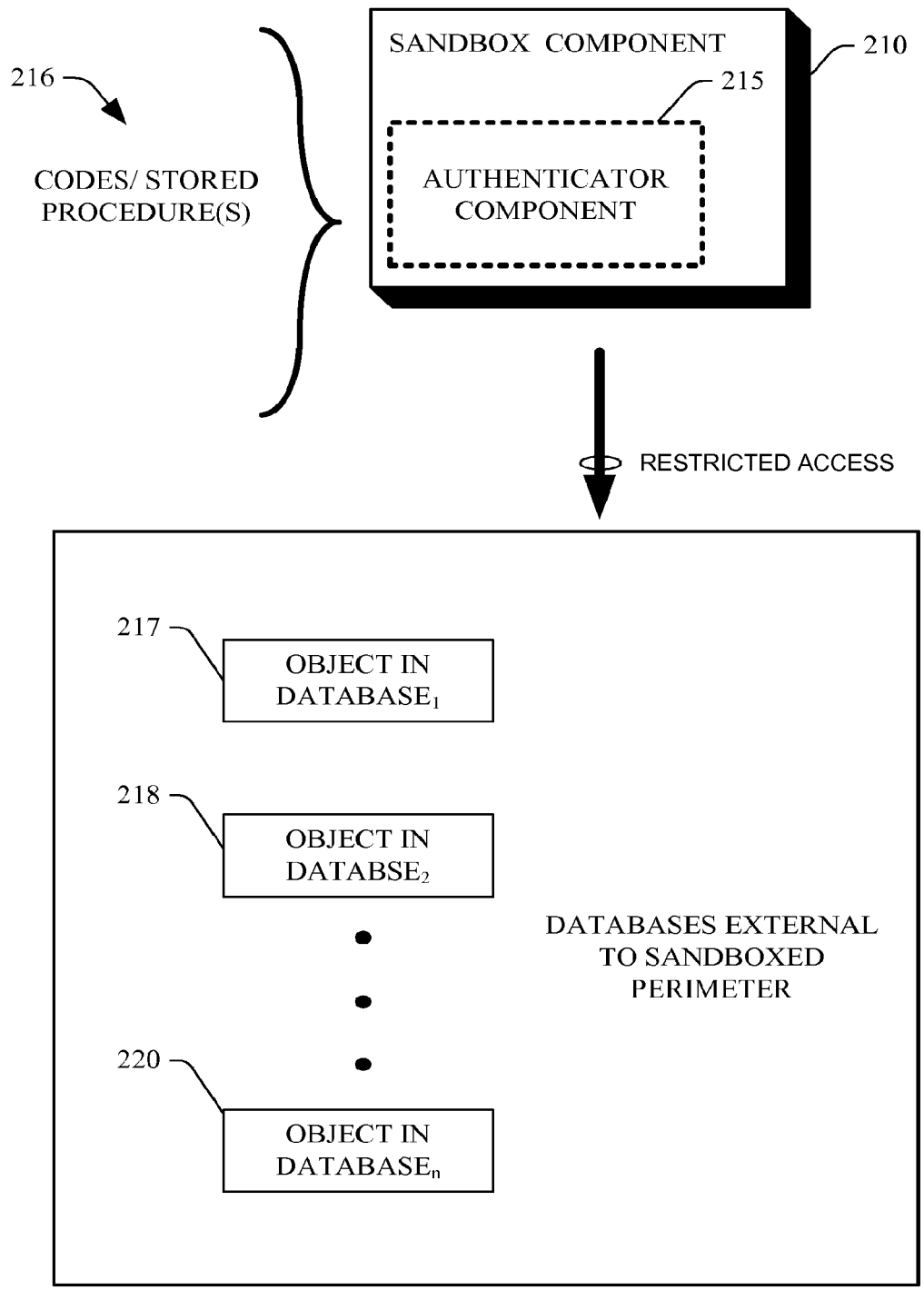
FIG. 2 illustrates a further block diagram of a sandbox component that includes an authentication component in accordance with a further aspect of the subject innovation.

FIG. 2 illustrates a further block diagram of a sandbox component 210 that includes an authenticator component 215 in accordance with a further aspect of the subject innovation. When codes or stored procedures 216 attempt to perform an operation on an object outside the database associated with codes 216, an automated check or determination can be performed by the authenticator component 215 to verify that the code is allowed and/or the level of such permission to call the objects 217, 218, 220 associated with databases external to the sandboxed perimeter (see Sandboxed Perimeter 120 in FIG. 1). If such check or determination succeeds, the code signifies that it has suitable privileges to operate on the respective object outside the sandboxed area or the database. As explained earlier, if the code does not have suitable privileges, the code can be denied access to the object outside the database. The sandbox component 210 can include attributes that are being set by a server administrator (e.g., attribute set to "1") to regulate access from one database owner to another database owner, wherein authenticator permission and/or trust permission levels are managed by the authenticator component 215. Accordingly, a code or piece of code originating from the database associated with the sandbox component cannot freely leave the database and be directed to other databases.

Accordingly, the authenticator component 215 can set privileges for codes that attempt to access an executable module (e.g., procedure, trigger, computed column) of a database external to the sandboxed area, wherein such assigned privileges typically do not exceed that of a database owner. For example, the resulting privilege set assigned to module execution context can be the most restrictive set between the module caller and the database owner. Such can be achieved by marking module security execution context to be authenticated or vouched by the database owner (dbo) in a sandboxed database. In a related aspect, the authenticator component 215 can further include notion of alternative database authenticator (alternative_authenticator), wherein such authenticator can replace the database authenticator when the database owner also acts as the database administrator, for example. It is to be appreciated that such Alternative_authenticator can be a regular user in the server and has limited set of privileges.

Figure 3:
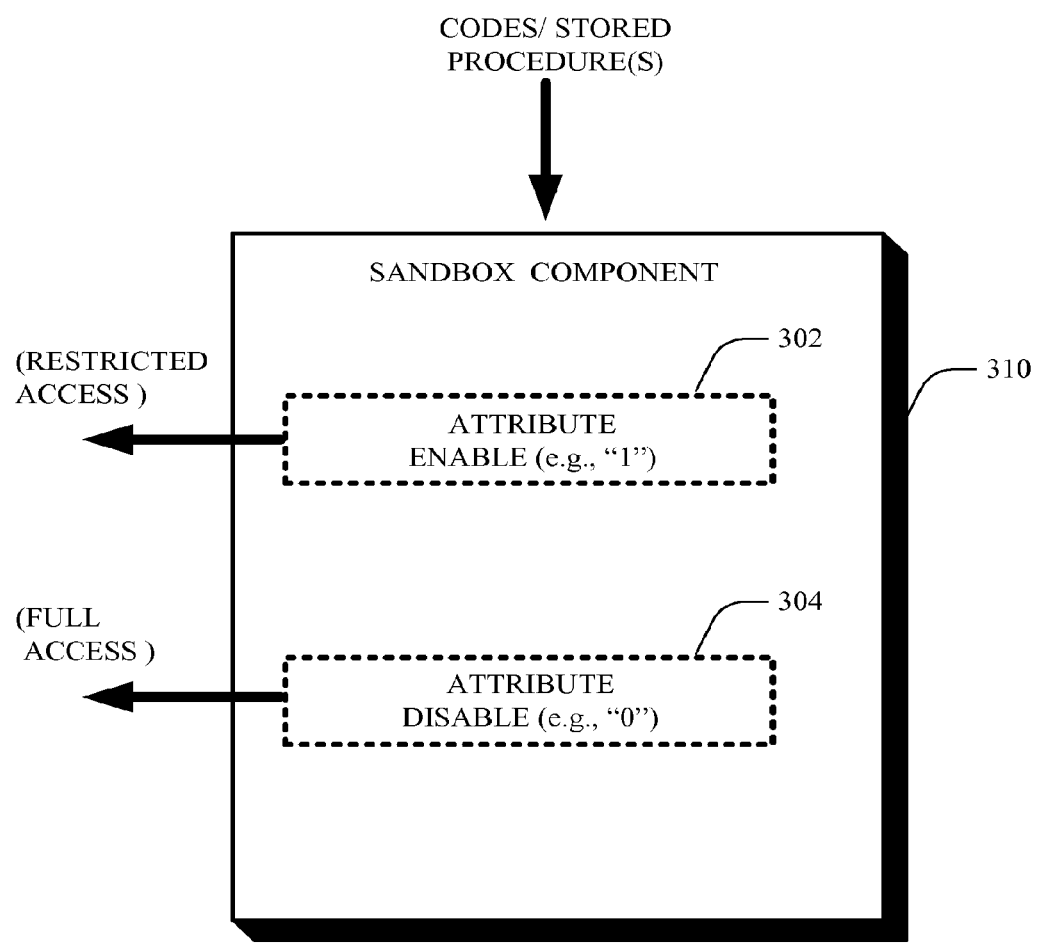
FIG. 3 illustrates a particular aspect of a sandbox component with database specific attributes.

FIG. 3 illustrates a particular aspect of a sandbox component 310 with two Database specific attributes of sandbox_database: enabled and disabled, and/or one attribute with two states of enabled or disabled. Such attributes 302 and 304 can be defined on each database, to govern any executable module (trigger, procedure, computed column, and the like) residing in the database as to whether such module has to be executed in the security context authenticated by the database administrator (db_admin) or dbo. For example if sandbox_database is enabled, then any module execution invoked by db_admin is performed in the context authenticated by dbo, If Sandbox_database is disabled the execution is instead performed in the context authenticated by db_admin effectively removing the sandbox restrictions on a trusted database. In general, when a new database is created, or attached, or restored, its sandbox_database attribute is enabled and a db_admin can alter the state of sandbox_database attribute.

Figure 4:
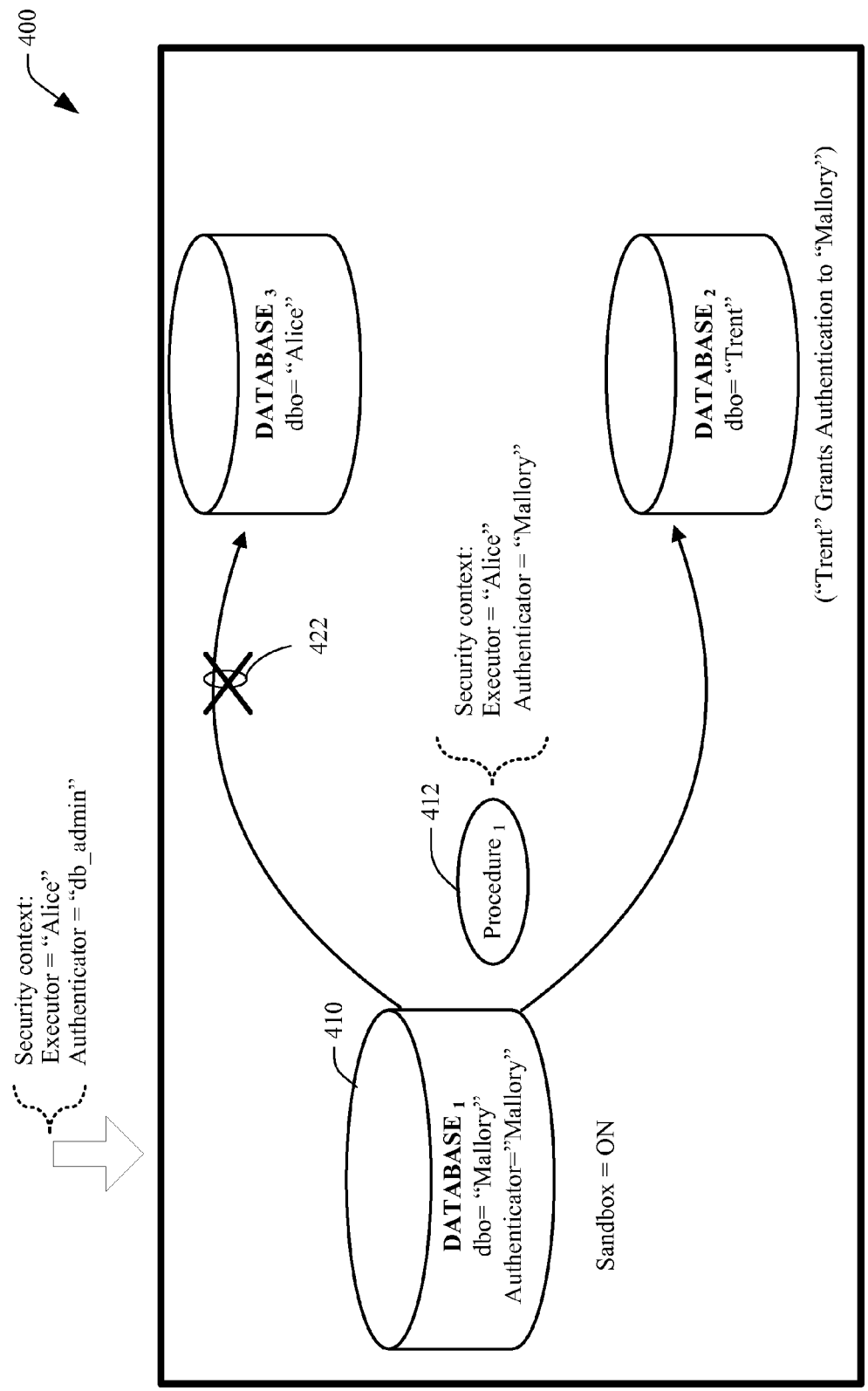
FIG. 4 illustrates a particular database sandboxing system in accordance with an exemplary aspect of the subject innovation.

FIG. 4 illustrates a particular database sandboxing system 400 in accordance with an exemplary aspect of the subject innovation. Typically, a module such as trigger or stored procedure residing in a user database can be executed under a security context of the executor. For example, since db_admin has full control in the server, if procedure Proc1 (412) associated with, or residing in database db1 (410) is executed by db_admin then access to any of the server resources by such procedure is allowed. However, if sandbox_database attribute is enabled on db1, the security context of the procedure is considered to be authenticated by dbo of the database 1 (db1). Such effectively creates a sandbox over the module, wherein the module can still be executed under the context of db_admin and has access to any resources, but only within the database db1. Such can be considered equivalent to reduction of db_admin set of privileges to that of the dbo. Likewise, when a user executing Proc1 is not db_admin and has a smaller set of privileges, Proc1 is allowed accessing resources within the privilege set of the user, but only within the scope of the sandboxed database. Thus, the resulting privilege set assigned to module execution context is the more restrictive set between the module caller and the database owner.

As illustrated, the sandboxed database 410 attempts to make two calls, namely a call to database 3 (db3) and a call to database 2 (db2). For example, such calls can be in form of a piece of code or stored procedure in the sand boxed database attempting to access objects in database 2 or database 3. The owner of db1, and the authenticator of such database 410 is "Mallory" who owns and uses the database 410. "Alice" is the server administrator who has rented database 410 to "Mallory", who also acts as the user. Any attempt by "Mallory" in attempting to induce "Alice" to employ the stored procedure 412 will fail as such stored procedure is halted 422 when trying to leave boundaries of database 410 (db1). The authenticator of the security context of the stored procedure is "Mallory", wherein "Mallory" has created the security context and such code has originated from Mallory's database—and hence is deemed trustable only to the level that Mallory is trusted (who created such code and the security context being so marked).

Likewise, if the stored procedure 412 is directed to database 2 (db2), wherein the owner of db2 is another user designated as "Trent", who has further indicated that "Trent" trusts "Mallory" by issuing authentication to "Mallory" in db2. As such, the sandbox component enables activities by codes generated by "Mallory" to the level of privilege granted to "Mallory". Such trust can be expressed by the notion of authenticators, wherein the decision to run the code is performed.

Figure 5:
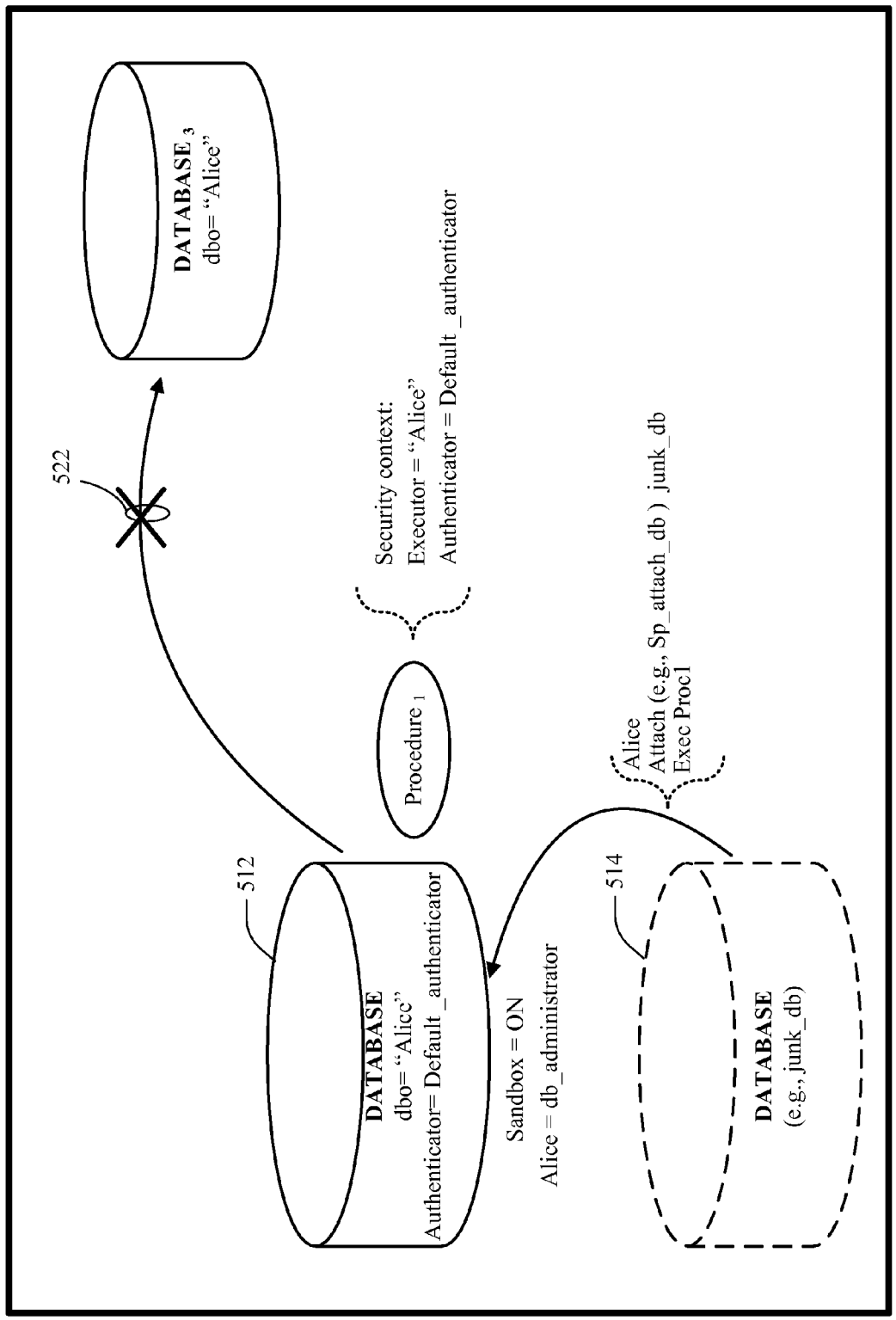
FIG. 5 illustrates a particular example of a database sandbox with default authenticator in accordance with an aspect of the subject innovation.

FIG. 5 illustrates a particular example of a database sandbox with default authenticator in accordance with an aspect of the subject innovation. Typically, when a database is attached to the database management system by a db_admin, its database owner and context authenticator subsequently become db_admin even, if the database is sandboxed. Such effectively removes protection offered by database sandbox feature for databases where dbo is db_admin. The subject innovation mitigates such threat by introducing alternative database authenticator (default_authenticator). In one aspect, the Alternative_authenticator is a regular server user who becomes the authenticator for module security execution context instead of dbo in any attached database. In general, Alternative_authenticator does not have privileges in the server, and can be employed when a database attribute use_default_authenticator is enabled; otherwise the dbo is used as the authenticator. Once database is believed to be trusted, use_default_authenticator can be disabled and database authenticator is determined by the state of sandbox_database attribute.

Additionally and as illustrated in FIG. 5, a default authenticator can be employed in conjunction with a Structured Query Language (SQL) server. "Alice" is the server administrator who also owns the database server 512. In one aspect, "Alice" can attach the database 514 to the server 512, and when such occurs "Alice" does not trust the database. When the database is attached, the sandboxing attribute can be automatically enabled to restrict and/or qualify access 522 to any object outside the database.

Figure 6:
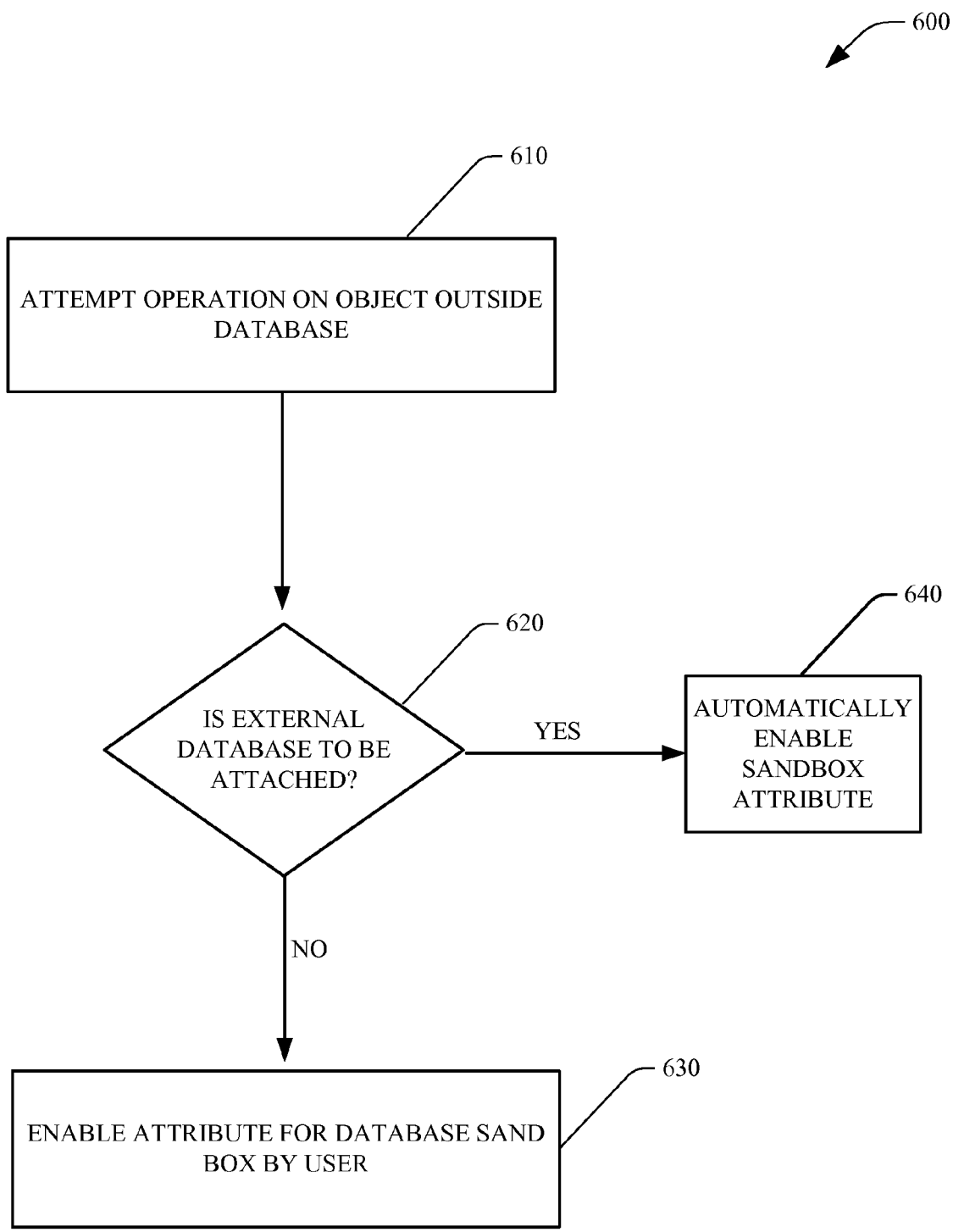
FIG. 6 illustrates a further methodology of qualifying a code for accessing external databases in accordance with an aspect of the subject innovation.

FIG. 6 illustrates a methodology 600 of qualifying and/or restricting access of codes in a database to objects outside a database, in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. At 610, an attempt occurs for operation on an object that resides outside the database. Next and at 620, a determination is performed to verify whether an external database is to be attached. If not, the methodology 600 proceeds to act 630 wherein a user can enable (e.g., manually) attribute(s) for database sandbox, to qualify and/or restrict access to objects outside the database. Otherwise, the methodology 600 proceeds to act 640, wherein the sandbox attribute can be automatically enabled. Such can restrict whether a code in the database can access any object outside the database—despite the fact that a person executing such code does in fact have permission to interact with the object that the code is attempting to access.

Figure 7:
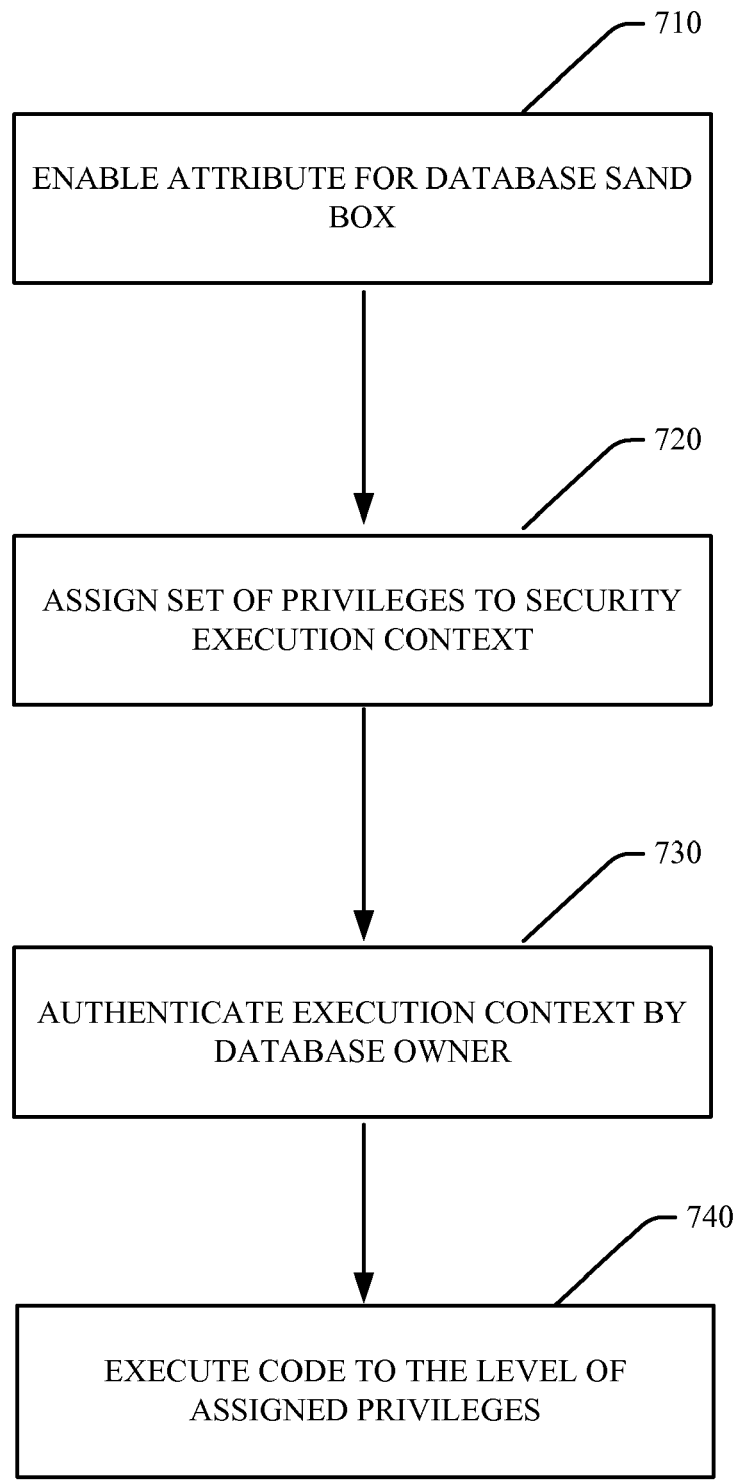
FIG. 7 illustrates a further methodology of sandboxing a database attached to a server in accordance with an exemplary aspect of the subject innovation.

FIG. 7 illustrates a related aspect of the subject innovation that qualifies access to any object outside the database. Initially and at 710 attributes associated with sandboxing the database can be set by a server administrator to regulate access to any object outside the database—wherein authenticator permission and/or trust permission levels are managed. At 720, set of privileges can be assigned to security execution context of an executable module (procedure, trigger, computed column) in an un-trusted database. For example, security execution context is restricted not to exceed a privilege set assigned to database owner, and resulting privilege set assigned to module execution context can be the most restrictive set between the module caller and the database owner. By marking module, at 730 security execution context can be authenticated or vouched by database owner in a sandbox database. Accordingly and at 740, a code can be executed to the level of assigned privileges, and a code or piece of code originating from such database cannot freely access objects in other databases. For example, when a code in the database attempts to perform an operation on an object outside the database, an automated check or determination can be performed to verify that the code is allowed to call the object outside the database. If such check or determination succeeds, the code signifies that it has suitable privileges to operate on the respective object outside the sandboxed area or the database. As explained earlier, if the code does not have suitable privileges, the code can be denied access to the object outside the database.

Hence, execution of malicious codes by system administrators (e.g., inadvertently or where system administrators are lured into such execution) is mitigated. Such further removes responsibility of code execution from the owner of the database. Accordingly, for introducing a database and upon attaching such database to a server (e.g., SQL server), the owner of the database is not deemed the creator of the code executed from the database.

Figure 8:
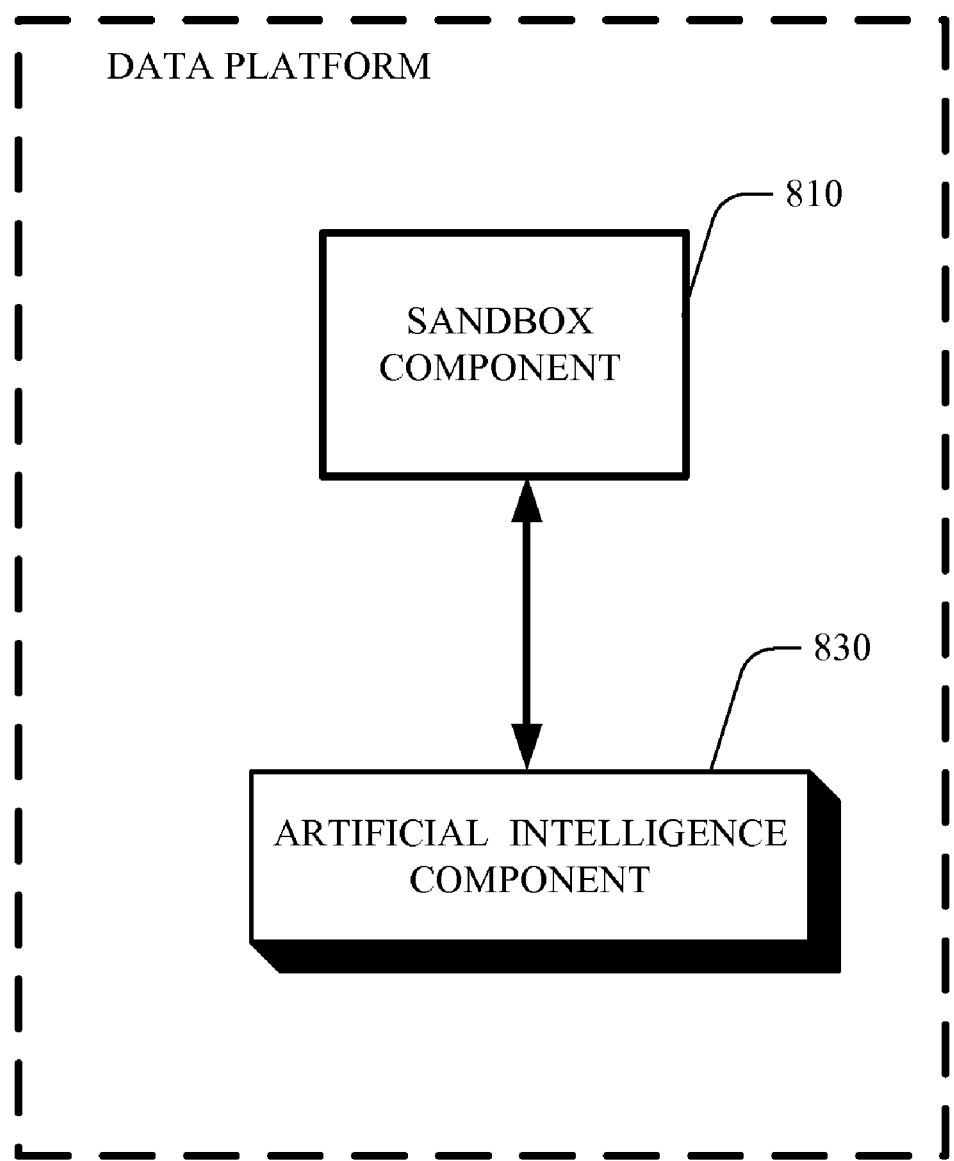
FIG. 8 illustrates an artificial intelligence component that interacts with a sandbox component in accordance with an aspect of the subject innovation.

FIG. 8 illustrates a data platform with a sandbox component 810 and an artificial intelligence (AI) component 830. The AI component 830 can be employed to facilitate inferring and/or determining when, where, how to dynamically decide when a code of a database is to be trusted. For example, such can occur in conjunction with an anti-virus application that scans databases that are created and/or attached. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 830 can employ any of a variety of suitable AI-based schemes as described supra in connection with facilitating various aspects of the herein described invention. For example, a process for learning explicitly or implicitly how a code or stored procedure is to be trusted can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As used in this application, the terms "component", "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
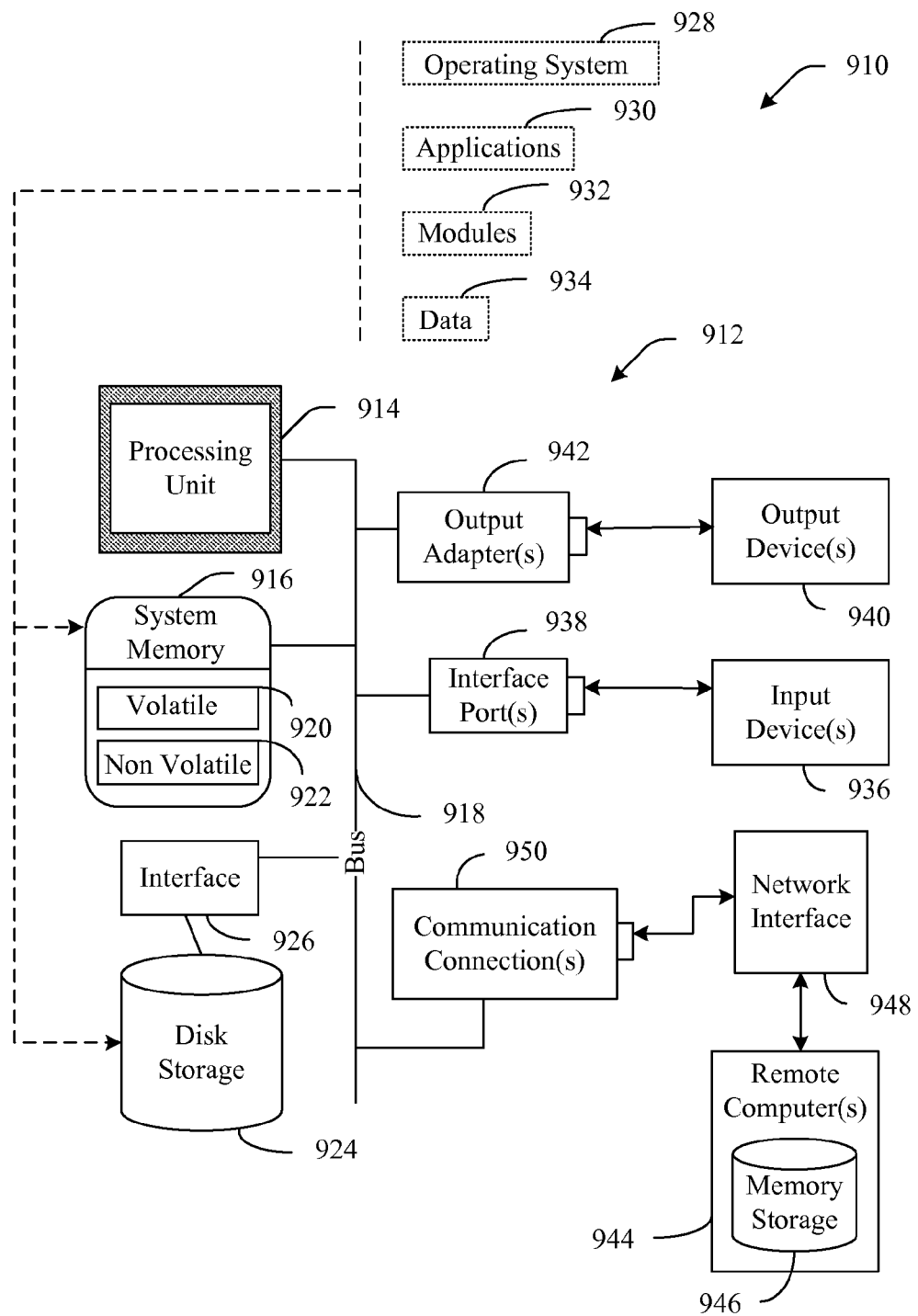
FIG. 9 illustrates an exemplary environment for implementing various aspects of the subject innovation.
Figure 10:
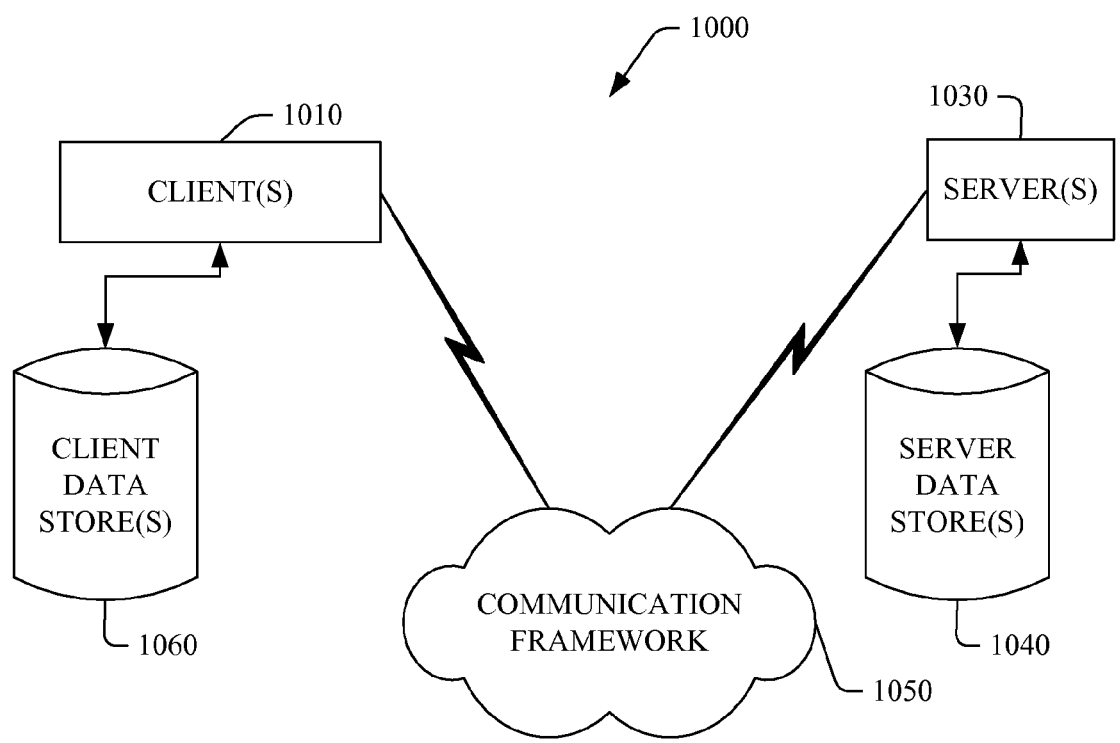
FIG. 10 is a schematic block diagram of a sample computing environment that can be employed for database sandboxing according to an aspect of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for implementing data retrieval, in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following computer executable components:

a database having one or more computer-readable storage devices configured to store database objects; and one or more computer-executable components, wherein the one or more computer-executable components, when executed, cause the computer implemented system to:

receive a request from an executable module to operate on a database object, wherein execution of the request has different permissions associated with each of: (i) a database administrator; (ii) a default authenticator who is a server user who becomes an authenticator for module security execution context instead of a database owner; and (iii) one or more users, wherein the database administrator has less restrictive permissions than the default authenticator, database owner, and the one or more users;

determine that the request is to operate on a database object outside of the database;

identify an operator of the computer implemented system from whom the request from the executable module originated; and qualify access to the database object by sandboxing the database, wherein the request of the executable module is treated such that:

when the request originated from one of the one or more users, access to the database object is based on permissions associated with the one of the one or more users and permissions associated with the default authenticator, whichever is more restrictive; and when the request originated from the database administrator, access to the database object for the database administrator is based on permissions associated with the default authenticator, despite the database administrator having less restrictive permissions than the default authenticator, such that the database administrator is granted access to the database object in a manner that is more restrictive than defined by the permissions associated with the database administrator.

2. The computer implemented system of claim 1, wherein the default authenticator is also a database owner assigned to the database, and wherein the database owner has more restrictive permissions than the database administrator.

3. The computer implemented system of claim 1, wherein the database administrator is also a database owner, such that the default authenticator is neither the database owner nor the database administrator.

4. The computer implemented system of claim 1, further comprising an authorization trust link for database object access.

5. The computer implemented system of claim 1, wherein the database object is within one or more Structured Query Language servers remote from the database.

6. The computer implemented system of claim 1, wherein the executable module is contained within the database.

7. The computer implemented system of claim 1, wherein the computer implemented system is further caused to determine whether the request is to operate on a database object within the database.

8. The computer implemented system of claim 1, further comprising an anti-virus application that scans the executable module.

9. A computer implemented method of controlling retrieval of data, comprising:
- at a computing system that includes a database, receiving a request from executable code to operate on a database object, wherein the database has permissions associated with each of: a database administrator, a database owner, and one or more users, and wherein the permissions of the database administrator are unlimited;
- determining that the request is to operate on a database object outside of the database in the computing system;
- identifying an operator of the computing system from whom the request from the executable code originated; and
- qualifying access to the database object by applying a sandbox, such that:
  - when the request originated from one of the one or more users, access to the database object is based on permissions associated with the one of the one or more users or the permissions associated with the database owner, whichever is more restrictive; and
  - when the request originated from the database administrator, access to the database object for the database administrator is based on permissions associated with the database owner, despite the database administrator having unlimited permissions, such that the database administrator is granted only restricted access to the database object.

10. The computer implemented method of claim 9, further comprising:
- accessing a sandboxing attribute, the sandboxing attribute identifying whether or not access to an untrusted database should be qualified.

11. The computer implemented method of claim 10, wherein the sandboxing attribute is modifiable by the server administrator but not the database owner.

12. The computer implemented method of claim 10, wherein when the sandboxing attribute identifies that access to the untrusted database should be qualified, access is restricted so that no operator can have access permissions greater than the permissions assigned to the database owner.

13. The computer implemented method of claim 9, further comprising attaching an external database to a server of the computing system.

14. The computer implemented method of claim 13, further comprising determining whether the external database is trusted.

15. The computer implemented method of claim 14, wherein when the external database is trusted as expressed by an issued authentication, the external database is trusted as a local database.

16. The computer implemented method of claim 14 further comprising limiting security execution context of executable code for the database to privileges assigned to the database owner except when: (i) the request is to access a local database; or (ii) the request is to access a trusted database, in which case operators maintain their own permissions.

17. The computer implemented method of claim 9, further comprising halting execution of the code.

18. The computer implemented method of claim 9, further comprising establishing an authorization trust link for accessing objects of other databases.

19. A computer implemented system comprising the following computer executable components:
- a database that includes one or more computer readable storage devices configured to store database objects; and
- one or more computer-executable modules, wherein the one or more computer-executable modules, when executed, cause the computer implemented system to:
  - receive a request from executable code to operate on a database object, wherein execution of the request has different permission sets associated with each of a database administrator, a database owner, and one or more users, wherein the database administrator has less restrictive permissions than the database owner and the one or more users;
  - identify an operator causing the executable code to issue the request;
  - determine whether the request is to operate on a database object outside of the database;
  - when the request is to operate on a database object within the database, apply the permissions corresponding to the identified operator;
  - when the request is to operate on a database object outside the database, determine whether the database object resides in an external database that is trusted by the database;
  - when the external database is trusted, apply the permissions corresponding to the identified operator;
  - when the external database is untrusted, qualify access to the database object by using a sandbox, such that:
    - when the identified operator is one of the one or more users, access to the database object is based on permissions that are the more restrictive of the permissions associated with the one of the one or more users and the permissions associated with the database owner; and
    - when the request originated from the database administrator, access to the database object for the database administrator is based on permissions associated with the database owner, despite the database administrator having less restrictive permissions than the database owner, such that the database administrator is granted access to the database object in a manner that is more restrictive than defined by the permissions associated with the database administrator.

* * * * *